Aug. 22, 1967 — H. ROBBINS — 3,337,780
RESISTANCE ORIENTED SEMICONDUCTOR STRAIN
GAGE WITH BARRIER ISOLATED ELEMENT
Filed May 21, 1964

INVENTOR.
HARRY ROBBINS
BY
Christie, Parker & Hale
ATTORNEYS.

United States Patent Office

3,337,780
Patented Aug. 22, 1967

3,337,780
RESISTANCE ORIENTED SEMICONDUCTOR STRAIN GAGE WITH BARRIER ISOLATED ELEMENT
Harry Robbins, Los Angeles, Calif., assignor to Bell & Howell Company, Chicago, Ill., a corporation of Illinois
Filed May 21, 1964, Ser. No. 369,227
8 Claims. (Cl. 317—234)

ABSTRACT OF THE DISCLOSURE

The invention relates to a strain gage formed in a crystal semiconductor with the conductive region isolated by a P–N-junction and oriented in the maximum resistance direction.

---

Previously known strain gage devices fabricated from semi-conductors provide certain advantages over metallic strain gages and have in part been accepted in the transducer industry. The more sophisticated semiconductor strain gage devices have been based on a P–N junction between a gaging region or zone and a substrate supporting the gaging region. Ideally the P–N junction electrically isolates the substrate from the gaging region such that current passed through a pair of contacts disposed solely within the region is isolated within the gaging region. The known prior art semiconductor strain gage devices isolated the current flowing through the device in only one direction. An example of the prior art semiconductor strain gage is disclosed in U.S. Patent 3,049,685.

For apparatus that normally operates at elevated temperatures, it is obviously advantageous to test the apparatus at its normal operating environment, thus requiring the gaging element to be also subjected to this temperature which in some cases may fluctuate during the test. While it is recognized that the resistivity of the semiconductor material fluctuates with temperature changes and correspondingly results in changes in the recorded strain, these variations may be calculated such that the strain as sensed by the gage will be accurate regardless of the temperature.

In accordance with my invention, I have isolated the current in the device in two directions of polarity and have eliminated or suppressed some of the undesirable features of the prior art semiconductor strain gage elements.

In terms of structure, the present invention includes a unitized semiconductor body having a plurality of barriers which tend to isolate the active or gaging region of the strain gage.

More particularly, the present invention includes a strain gage element formed from a body of semiconductor material having at least three distinct regions with P–N junctions formed between abutting regions. A pair of electrodes are in ohmic contact with solely one of the regions and the remaining regions are entirely free of electrodes. However, a leakage path through a bonding agent may be created when the semiconductor body is bonded to a member in which strain is to be sensed. The junctions formed between abutting regions act as progressive barriers to current leakage, isolating the gaging region bearing the electrodes from the leakage path through the bonding agent.

Figure 1:
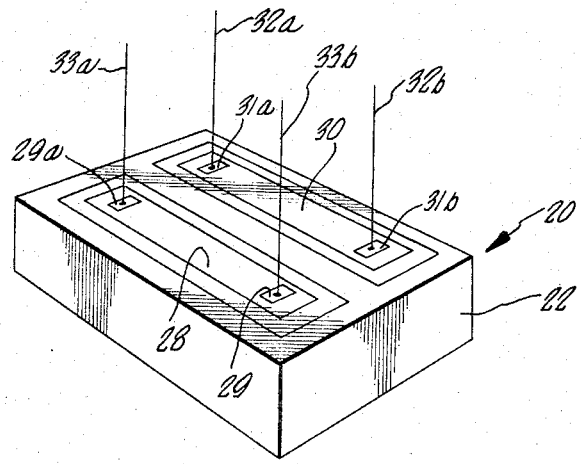
Figure 2:
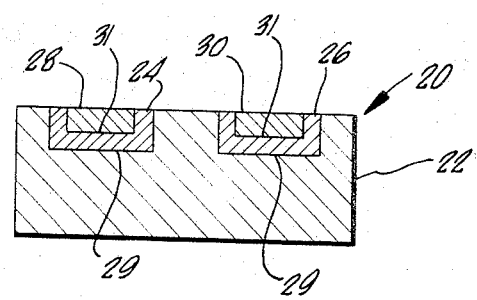

Other features and advantages of the present invention will become more readily apparent from the following detailed description and the attended drawings wherein:

FIG. 1 is a persepective view of a strain gage element constructed according to the present invention; and FIG. 2 is a typical cross-sectional view of the gage illustrated in FIG. 1.

For purposes of clarity the present invention will be described in terms of P–N–P semiconductor device. It will, however, be understood that the invention is applicable in a similar manner to produce N–P–N devices. The semiconductor material may be silicon, germanium, silicon carbide, or stoichiometric compounds comprised of elements from Group III of the Periodic Table, for example, gallium, aluminum, indium, and elements of Group V, for example, arsenic, phosphorous, and antimony. Examples of suitable Group III–V stoichiometric compounds are gallium arsenide, indium antimonide, and indium phosphide.

Referring now to FIGS. 1 and 2, a perferred embodiment of the present invention will now be described. A strain gage 20 includes a wafer 22 of P-type semiconductivity with a pair of regions 24, 26 placed in side by side arrangements and have generally a rectangular configuration. Regions 24, 26 are formed of N-type semiconductivity and are preferably deposited upon wafer 22 by the diffusion process. A second pair of regions 28, 30 are placed in side by side arrangements and disposed entirely within their respective diffused regions 24, 26. Regions 28, 30 are preferably deposited upon the strain gage element 20 by the diffusion process.

Metallic ohmic contacts 31A, 31B are deposited upon region 30 and ohmic contacts 29A and 29B are deposited upon region 28. Preferably the metallic contacts are aluminum deposited upon and fused to the respective regions. The composition of the contacts is not considered to be critical and may be of any suitable ohmic material either neutral or P-type. Electrical leads or electrodes 32A, 32B are applied to contacts 31A, 31B in a conventional manner. Leads 33A, 33B are also applied to contacts 29A, 29B, respectively, in a conventional manner.

A plurality of electrodes 32A, 32B and 33A, 33B are in ohmic contact in spaced relation with each other and within their respective regions 28, 30.

A first set P–N junction 29 is formed between the abutting surfaces of regions 24, 26 with wafer 22, and a second set of P–N junctions 31 is formed between the abutting surfaces of regions 28, 30 with their respective underlying regions 24, 26.

The fabrication of the present invention will be described using a semiconductor material such as silicon; however, this material is chosen for ease in description rather than a limitation of the invention.

To produce the gage element 20, wafer 22 is cut from a silicon rod of P-type material with a diamond saw and thereafter the surface is lapped or etched or both to produce a smooth surface after sawing.

It is to be understood that the crystal is oriented prior to slicing such that the crystallographic axis of the semiconductor is arranged such that the piezoresistance is at a maximum in the direction desired for the length of the wafer.

The N-type regions 24, 26 are formed into the surface of wafer 22. The surface of the wafer is covered with a material which is an effective barrier to the diffusion of impurties and may be an oxide film which in the case of silicon would be silicon dioxide which may be formed by exposing the wafer 22 in an atmosphere such as ordinary air or oxygen and heating its surface. A window the size of regions 24, 26 is formed on the surface of wafer 22 by using a standard photoresist compound which will allow the etching solutions to "open" the windows in the selected areas of the wafer 22. N-type doping material is diffused into the regions 24, 26 by exposing wafer 22 in an atmosphere of a diffusion furnace in which the vapor of a donor doping material such as, for example, one element from Group V of the Periodic Table, for example, antimony, arsenic, or phosphorus. The wafer 22 is retained within the diffusion furnace to the point where the diffusant penetrates to at least one micron within the surface of wafer 22 and is thereafter removed.

The diffusion step is again repeated wherein P-type doping materials are diffused within the surface of regions 24, 26. The masking procedure is repeated and the windows are opened to coincide with the shape of regions 28, 30. A diffusion material having P-type doping material or alloy is introduced within the diffusion furnace and the diffusion carried out until the doping impurity diffuses into the surface of the wafer forming a P–N junction between regions 24, 28, and 26, 30 respectively. It should be noted that the diffusion of the P-type impurity must not penetrate the P–N junction between the wafer 22 and regions 24, 26. Thus two distinct P–N junctions are formed one between wafer 22 and regions 24, 26, and a second formed between regions 24, 26 and second regions 28, 30, respectively.

It is to be recognized that while strain gage element 20 is an embodiment of the present invention, it is merely illustrative and not a limination thereof. For instance, two strain gage regions 28, 30 have been illustrated for the reason that generally in the strain gage art, a pair of strain gage regions are used in combination as two legs of a standard Wheatstone bridge during the conventional strain gage test.

I claim:
1. A strain gage element comprising:
   a unitized semiconductor body having at least three regions thereon with two P–N junctions formed therein in spaced relation with each other and disposed between abutting regions, and
   a pair of ohmic contacts placed solely in a first region, the distance between the contacts defining a length of said first region, the crystallographic axis of the semiconductor being such that said first region has greater piezoresistance along said length than along its width,
   at least one of the remaining semiconductor body regions distinct from the region having the ohmic contacts thereon being devoid of external electrical contacts thereon,
   whereby the plurality of P–N junctions tend to isolate the region having the contacts thereon.
2. A strain gage element comprising:
   a semiconductor body including a first, second, and third regions of a semiconductor material each abutting at least one other region and having opposite conductivity abutting each other, and
   a means for providing electrical contacts such that the contacts are solely within one of the regions and along a line defining a length of said region, the crystallographic axis of the semiconductor being such that said one region has greater piezoresistance along said length than along its width, at least one of the remaining regions being devoid of external electrical contacts of any kind such that the remaining regions tend to electrically isolate the region having the contacts therein.
3. A strain gage device comprising:
   a semiconductor body having a P-type conductivity material,
   a first layer of N-type semiconductor material disposed on the semiconductor body,
   a second layer of P-type semiconductor material disposed on the N-type semiconductor material and devoid of any engagement with the body of P-type conductivity material, and
   a pair of electrical contacts attached to the second layer of P-type material, the distance between the contacts defining a length of said second layer, the crystallographic axis of the semiconductor being such that said second layer has greater piezoresistance along said length than along its width, the first layer of N-type material being devoid of external contacts thereon,
   whereby the first layer and the body of semiconductor material tend to isolate a second layer from current leakage.
4. A strain gage as defined in claim 3 and in addition: the second layer is disposed entirely within the confines of the first layer.
5. A strain gage device comprising:
   a body of semiconductor material including a first region of a type of material having a first type of conductivity,
   a pair of second regions of semiconductor material in spaced relation with each other and disposed upon the first region and having a conductivity opposite the conductivity of the first region, and
   a separate third region of semiconductor material mounted on each second region and having a conductivity opposite that of the second regions and completely out of contact with the first region, and
   a separate pair of electrical contacts in engagement with and defining a length of each third region of semiconductor material, the crystallographic axis of the semiconductor being such that at least one of said third regions has greater piezoresistance along said length than along its width, the pair of second regions being complete devoid of external electrical contacts,
   whereby the second regions tend to isolate the third regions from leakage.
6. A strain gage device as defined in claim 5 in which each third region is completely within the confines of each second region.
7. A strain gage device comprising:
   a body of semiconductor material including a first region of P-type semiconductor material,
   a second region of N-type semiconductor material diffused upon the first region,
   a third region of P-type material diffused upon the second region of semiconductor material completely out of contact with the third region, and
   a pair of ohmic contacts disposed on the third region, the distance between the contacts defining a length of said third region, the crystallographic axis of the semiconductor being such that said third region has greater piezoresistance along said length than along its width, the second region being completely devoid of external electrical contact whereby the first and second regions tend to isolate the third region from the current leakage.
8. A strain gage device as defined in claim 7 wherein the third region is contained entirely within the second region.

References Cited

UNITED STATES PATENTS

| | | | |
|---|---|---|---|
| 2,735,919 | 2/1956 | Shower | 338—15 |
| 2,936,425 | 5/1960 | Shockley | 148—1.5 X |
| 3,028,655 | 4/1962 | Dacey et al. | 148—1.5 X |
| 3,049,685 | 8/1962 | Wright | 317—235 |
| 3,104,991 | 9/1963 | MacDonald | 148—1.5 |
| 3,221,215 | 11/1965 | Osafune | 317—235 |
| 3,265,905 | 8/1966 | McNeil | 317—235 |
| 3,266,303 | 8/1966 | Pfann | 317—235 |

FOREIGN PATENTS 923,153   4/1963   Great Britain.

JAMES D. KALLAM, *Primary Examiner.*

RICHARD M. WOOD, *Examiner.*

H. T. POWELL, *Assistant Examiner.*